May 10, 1966  L. R. SCHUESSLER  3,250,456
MAILING UNIT

Filed Sept. 14, 1964  4 Sheets-Sheet 1

| JOHN B. DOE M.D. 123 MAIN ST., ST. LOUIS MO., 63106 | DATE MO. DA. YR. | |
|---|---|---|
| PATIENTS ACCOUNT NUMBER INDICATE IF NOW IN USE ☐ NEW ☐ NO 1901301 | CONTROL NO. J DOE 01 | |
| NAME HARRY SMITH | PATIENT | |
| ADDRESS 987 CENTER ST. LEMAY MO., 63156 | PATIENT CODE 1. SELF 2. HUSBAND 3. WIFE | |

| S/C | P/C | PROFESSIONAL SERVICE | CHARGE | CREDIT |
|---|---|---|---|---|
| BS | | BLOOD SUGAR | | |
| HB | | HEMOGLOBIN | | |
| HC | | HOUSE CALL | | |
| NS | | NASAL SMEAR | | |
| OV | | OFFICE VISIT | | |
| PT | | PROTHROMBIN TIME | | |
| SP | | SPUTUM | | |
| SR | | SEDIMENTATION RATE | | |
| UA | | URIC ACID | | |
| UR | | URINALYSIS | | |
| XR | | X-RAY | | |
| | | TOTAL | | |

FIG. 1.

INVENTOR
LEVYN RAY SCHUESSLER
BY Cohn and Powell
ATTORNEYS

May 10, 1966  L. R. SCHUESSLER  3,250,456
MAILING UNIT
Filed Sept. 14, 1964  4 Sheets-Sheet 2

HARRY SMITH
987 CENTER ST.
LEMAY MO. 63156

190130    J DOE 01

JOHN B. DOE M.D.
123 MAIN ST.
ST. LOUIS, MO. 63106

CHECK DATED_____ FOR $____ IS ENCLOSED

↑FOLD ON THIS LINE—PLACE CHECK BETWEEN FOLD PORTIONS AND INSERT IN RETURN ENVELOPE TO SHOW DOCTORS NAME.

JOHN B. DOE M.D.
123 MAIN ST.
ST. LOUIS, MO. 63106

CHECK DATED_____ FOR $____ IS ENCLOSED

HARRY SMITH
987 CENTER ST.
LEMAY MO. 63156

190130    J DOE 01

↑PLEASE DETACH AND RETAIN BOTTOM

| DATE | | | OFC. RECORD | SER. CODE | PAT. CO. | CHARGES | CREDITS | ST. DATE | PRE. BALANCE |
|------|---|---|---|---|---|---|---|---|---|
| MO | DA | YR | | | | | | | BALANCE DUE |
| | | 50 | | 51 | 52 | 53 | 54 | 37 | |

JOHN B. DOE M.D.
123 MAIN ST.
ST. LOUIS, MO. 63106

PLEASE PAY THIS AMOUNT → 55

FIG. 2.

May 10, 1966     L. R. SCHUESSLER     3,250,456
MAILING UNIT

Filed Sept. 14, 1964     4 Sheets-Sheet 3

| DESCRIPTION | AMOUNT | |
|---|---|---|
| | 10 | 00 |
| | 15 | 00 |
| | 5 | 00 |
| | 25 | 00 |
| 98 | 7 | 00 |
| | 4 | 00 |
| | 20 | 00 |

—60

CARRY TOTAL TO OTHER SIDE

FIG. 3.

May 10, 1966     L. R. SCHUESSLER     3,250,456
MAILING UNIT

Filed Sept. 14, 1964     4 Sheets—Sheet 4

FIG. 4.

United States Patent Office 3,250,456
Patented May 10, 1966

3,250,456
MAILING UNIT
Levyn Ray Schuessler, 301 N. Forsyth Blvd.,
Clayton, Mo.
Filed Sept. 14, 1964, Ser. No. 396,088
8 Claims. (Cl. 229—92.1)

This invention relates generally to improvements in a mailing unit, and more particularly to an improved unit of this type adapted for use by senders of accounts-receivable statements.

An important objective is achieved by the provision of a sheet constituting the accounts-receivable statement in the mailing unit which is divided by a fold-tear line into a statement and a two-way stub, the stub being divided by another fold-tear line into a pair of stub portions. This account-receivable statement can be conveniently and readily processed by an accounting machine which will result in considerable economy for the user.

Another important object is afforded by the provision of specifically disposed address sections on the stub portions of the two-way stub which cooperate with correspondingly located windows in an envelope, and which thereby expedite the mailing of the statements and provide a considerable financial saving to the user of such mailing unit.

Still another important objective is attained in that the two-way stub, when separated from the statement and returned with a check to the statement-sender, can be divided into stub portions, one of which is retained by the statement-sender with a copy of a bank deposit ticket, while another is sent to an accounting service company with another copy of the bank deposit ticket. Because all of the pertinent information is contained on the stub portions, only the amount of the checks need be listed on the deposit ticket, except in those instances when a check or cash is received without the accompanying two-way stub.

An important objective is provided by the provision of a related receipts journal that is used to enter the date and amount of each deposit and all essential information pertaining to each payment (cash or check) received without the two-way stub, the page number of the journal being noted on the deposit ticket to identify each such check.

Another important object is achieved in that the mailing unit enables the account of any business, and especially the account of a professional man such as a doctor, to be readily processed by an accounting service company using automatic accounting equipment. Small businesses that could not afford the use of these types of accounting machines previously, in view of the fact that they send out relatively few statements in any accounting period, i.e., per month for example, can now take advantage of the economy provided by employing an accounting service company having such modern automatic equipment to send statements and keep accounting records for them.

The foregoing and numerous other objects and advantages of the invention will more clearly appear from the following detailed description of a preferred embodiment, particularly when considered in connection with the accompanying drawings, in which:

FIG. 1 is a top plan view of a charge sheet;
FIG. 2 is a top plan view of an accounts-receivable statement in a continuous form used in the mailing unit;
FIG. 3 is a top plan view of a deposit ticket, and
FIG. 4 is a top plan view of a receipts journal.

Referring now by characters of reference to the drawings, the mailing unit and the accounting procedure in which it is used will be described relative to a doctor's business. It will be clearly understood that the mailing unit can be used with equal facility to any other business sending account-receivable statements.

FIG. 1 illustrates a charge sheet used by the doctor's office. The upper portion of this charge sheet 10 is imprinted with the doctor's name and address 11 and the doctor's account or control number 12. Provision is made for the insertion of the particular patient's account number 13 with an indication whether the number is in use or new. In addition, space is provided on the upper portion of this charge sheet 10 for the name and address 14 of the patient; space is also provided to indicate the patient's code, that is, whether the patient is son, daughter, father or the like.

The lower portion of the charge sheet 10 is provided with a plurality of columns. The extreme left hand column 16 is imprinted with the service code which is an abbreviation for the particular service provided by the doctor, the service itself being explained fully and imprinted in the professional service column 17. A charge column 20 is provided in which the amount of any charge for any service can be entered. An adjacent credit column 21 enables the entry of any allowance or cash payment made when service is rendered.

The doctor's office fills in the name and address of the patient in the space 14 provided and inserts the patient's account number if one has been assigned or indicates that the patient is new so that an account number can be assigned. Then the appropriate charge is entered in the charge column 20 opposite the particular professional service to which it applies. Any credit made as an allowance or for a payment made by the patient when served (before any statement has been made) can also be entered in the credit column 21.

This charge sheet 10 is then sent to the accounting service company for processing. If the patient already has an account number, the service bureau makes a punch card for each charge or credit. If the patient is new, a punch card is made for the name and address and an account number is assigned. Every entry or item of printed matter, if printed by the automatic accounting machines, requires a punch card.

The accounting service company utilizes a blank continuous roll generally indicated at 22 and partially shown in FIG. 2 in connection with an accounting machine of a type that can be programmed to imprint information from punched cards. The blank continuous roll 22 consists of a plurality of accounts-receivable statements 23 integrally connected by intervening tear lines 24, one of the accounts-receivable statements 23 being shown in FIG. 2 after processing by the accounting service company.

One type of accounting machine presently on the market is the IBM 402 Alphabetical Accounting Machine that is adapted to prepare reports and records from punched IBM cards. This machine reads and records details from 88 column cards, and adds, substracts, optionally multiples, and prints any desired combination of 80 of the columns.

In the present system, the accounting machine is programmed to imprint information contained on a name and address card, a summary balance card, accounts-receivable credit cards and accounts-receivable debit cards. The accounts-receivable credits and debits cards are generally designated as transaction cards. The accounting machine is programmed to imprint the information contained on such cards in precise locations on the blank continuous roll 22 fed into and through such machines.

As is shown in FIG. 2, a series of longitudinally spaced holes 25 extend along the opposite margins of the roll 22, such holes 25 being adapted to engage certain tracking, registering and feeding apparatus in the accounting machine. A longitudinal tear line 26 is provided at one side of the roll just inwardly of the longitudinal row of holes 25. A similar longitudinal tear line 27 is provided along the opposite side of the roll 22 just inwardly of the other longitudinal row of holes 25. The size of the individual statements 23 can be varied merely by placing tear lines 26 and 27 in appropriate position.

The continuous roll 22 is maintained in a stacked, folded position as it is fed into the accounting machine. The accounts-receivable statements 23 comprising the roll 22 are folded back and forth along the transverse tear lines 24. Similarly, the continuous roll 22 as it leaves the accounting machine also assumes the stacked, folded position.

Each of the accounts-receivable statements 23 comprising the continuous roll 22 is provided with a transverse fold-tear line 30 that divides the sheet into a statement 31 at the bottom and a two-way stub 32 at the top. Another transverse fold-tear line 33 located above and parallel to the first transverse fold-tear line 30 divides the two-way stub 32 into a pair of stub portions 34 and 35. The only thing printed on each accounts-receivable sheet 23 of the blank continuous roll 22 is the bracket 36 on the stub portion 34 which defines the space provided for the imprinting of the patient's name and address by the accounting machine, the bracket 36 serving to accurately align and register the continuous roll 22 in the accounting machine. Under some circumstances the triangular indicator 37 may be printed on each sheet 23 of the continuous roll 22, the indicator 37 showing the extreme right hand limit on the sheet at which the specific accounting machine can imprint both alphabet and numbers.

The information imprinted on the continuous roll 22 (assuming that the roll 22 is blank when fed into the accounting machine) is that which is placed by the accounting machine as programmed and obtained from punch cards. The accounting machine imprints the patient's name and address at 40 constituting the statement-receiver section at one end and near the top of the stub portion 34. This stub portion 34 is also imprinted with the patient's account number at 41, that account number being unique and assigned to the one to whom the statement is to be sent. The upper stub portion 34 is also imprinted with the doctor's control number at 42 which is unique and assigned to the one who is sending the statement.

The other stub portion 35 is imprinted with the patient's name and address at 43 constituting a statement-receiver section at one end adjacent to the transverse fold-tear line 30. This stub portion 35 is also imprinted with the patient's account number and the doctor's control number at 44 and 45 respectively.

The lower portion of the sheet constituting the statement 31 is imprinted with the statement date at 46, the previous balance at 47, the date at 50 on which a charge or credit is made or entered, the service code at 51 which indicates the service performed, the patient's code at 52 which indicates the particular patient treated, the charges at 53 and any credits at 54. The accounting machine in its computation determines the balance to be paid and imprints the figure at the appropriate space indicated generally at 55.

After the continuous roll 22 has been imprinted on each accounts-receivable sheet 23 with the process information by the accounting machine, the sheets 23 are separated by severing the roll 22 along the tear lines 24, 26 and 27, or by cutting the roll 22 within the area defined by the tear lines 24, 26 and 27 to provide accounts-receivable sheets of any desired size. The individual sheets 23 are then fed into a printing machine such as a Multilith or an A B Dick offset machine which serves to print on each individual sheet 23 the letterhead of the one sending the accounts-receivable sheet 23, form lines and legends, any desired descriptive material and advertisements.

For example, the printing machine will print the doctor's name and address at 56 constituting the statement-sender section adjacent the fold-tear line 33 and spaced below the statement-receiver section 36 on the top stub portion 34. All of the other descriptive material shown on the top stub portion 34 is printed by the printing machine.

On the stub portion 35 between the fold-tear lines 30 and 33, the printing machine prints the doctor's name and address at 57 constituting a statement-sender section spaced above the statement-receiver section 43 and located adjacent the fold-tear line 33. The instructions and other material appearing on the stub portion 35 are printed by the printing machine also.

The printing machine prints the form lines, columns, headings and instruction material together with the doctor's name and address on the statement 31 below the fold-tear line 30. Because the accounting machine imprinted its processed information at the appropriate locations, such information will appear in the appropriate columns of the printed form provided by the printing machine.

The accounting service company will then fold the accounts-receivable sheet 23 along the fold-tear line 30 and insert such sheet 23 into a two-window envelope (not shown) so that the statement-receiver section 43 on stub portion 35 will appear through the addressee window while the statement-sender section 57 will appear through the addressor window.

The patient receiving the accounts-receivable sheet 23 will detach the statement 31 by severing the sheet along the fold-tear line 30. This statement 31 is retained by the patient. The two-way stub 32 together with a check for the amount due is mailed to the doctor. Specifically, the patient will place his check between the two stub portions 34 and 35 folded along the fold-tear line 33, and the two-way stub 32 together with the check is placed in an envelope having an addressee window so that the statement-sender address 56 on the stub portion 34 will appear through such addressee window. Under some circumstances it is possible for this return envelope to have an addressor window through which will appear the statement-receiver section 36 on the stub portion 34.

As payments are received by the doctor, the doctor's office will make out a bank deposit ticket 60 (FIG. 3) in triplicate, merely listing the amount of the checks received with the two-way stubs 32. The two-way stub 32 is separated by tearing along the fold-tear line 33 to provide individual stub portions 34 and 35. The doctor's office will retain one copy of the deposit ticket 60 with the stub portions 35. Another copy of the deposit ticket 60 is attached to the stub portions 34 and returned to the accounting service company. The accounting service company will then make out the appropriate punch card for each patient's account to reflect each credit to be utilized in preparing statements for the next accounting period.

Of course, it is possible that the patient will pay cash or will send a check without returning the two-way stub 32. In this event, the doctor's office is provided with a receipts-journal 61 in which such payments are entered. The receipts-journal 61 (FIG. 4) includes a plurality of pages bound together, each page having provision for entry of the month at 62, the year at 63, the particular page number at 64 and the doctor's control number at 65. A plurality of columns are provided on each page for the entry of the date at 66, the entry of the patient's account number at 67, the entry of pertinent informaion such as patient's name at 70, the entry of money received at 71 and the entry of money paid out and/or deposited at 72.

If it is assumed that a patient sent a check without returning the two-way stub 32, the doctor's office will utilize the receipts-journal 61 by entering the date of receipt at 66, the patient's account number at 67, the patient's name at 70 and the amount of the check at 71. Then, when making up the bank deposit ticket 60, the page number 64 of the receipts-journal 61 on which this check is entered is designated on the deposit ticket next to the listing of the check amount. The doctor's office will periodically send these pages of the receipts-journal 61 to the accounting service company also so they can then pick up those payments appearing in the receipts-journal and make out the appropriate punch cards.

The original of the bank deposit ticket 60 together with the checks is sent to the bank for deposit as is conventional.

For the convenience of the doctor's office, the receipts-journal 61 may incorporate the usual checks 73. Each page of the receipts-journal 61 may be provided with a form that will indicate the balance in the bank at any time.

It will be importantly understood that it is the provision of and the particular construction of the accounts-receivable sheet 23 as disclosed in FIG. 2 which makes this system of accounting and service possible. It is necessary to have the two-way stub 32 integrally attached to, yet selectively separable from the statement 31 by the fold-tear line 30, and it is necessary to provide that such two-way stub 32 can be separated along the fold-tear line 33. The particularly located positions of the statement-receiver and sender sections on each of the stub portions 34 and 35 enable the cooperation of the sheet 23 and the two-way stub 32 with cooperating envelopes having appropriate windows for mailing. The accounts-receivable sheet 23 individually and with the windowed envelopes provide a unique and advantageous mailing unit.

Although the invention has been described by making detailed reference to a preferred embodiment, such detail is to be understood in an instructive, rather than in any restrictive sense, many variants being possible within the scope of the claims hereunto appended.

I claim as my invention:

1. In a mailing unit:
   (a) a sheet having a first fold-tear line that divides the sheet into a statement and a two-way stub,
   (b) a second fold-tear line dividing the two-way stub into two stub portions,
   (c) one stub portion including an addressee section at one end, and an addressor section spaced above the addressee section,
   (d) the other stub portion including an addressee section at one end, and an addressor section spaced above the addressee section,
   (e) an envelope having an addressee window at one end showing the addressee section on one stub portion when the sheet is folded about the first fold-tear line, and having an addressor window spaced above the addressee window showing the addressee section on the last said one stub portion,
   (f) another envelope having an addressee window at one end showing the addressee section of the other stub portion when the statement is detached along the first fold-tear line and the two-way stub is folded along the second fold-tear line, and
   (g) the stub portions being separated along the second fold-tear line by the sender upon return to the sender for account processing.

2. In a mailing unit:
   (a) a sheet having a first transverse fold-tear line that divides the sheet into a statement and a two-way stub,
   (b) the statement including a plurality of columns for the entry of charges, credits, balance and other information,
   (c) a second transverse fold-tear line dividing the two-way stub into two stub portions,
   (d) each stub portion including a statement-receiver account number and a statement-sender account number, and each stub portion being provided with a section for the entry of money paid by the receiver,
   (e) one stub portion including an addressee section at one end, and an addressor section spaced above the addressee section,
   (f) the other stub portion including an addressee section and an addressor section, and
   (g) the stub portions being separable along the second fold-tear line so that the sender can retain one stub portion and so that an accounting service company can have the other stub portion to process the receiver's account, identified by the statement-receiver account number, for the sender, identified by the statement-sender account number using automatic accounting equipment.

3. In a mailing unit:
   (a) a sheet having a first transverse fold-tear line that divides the sheet into a statement and a two-way stub,
   (b) a second transverse fold-tear line dividing the two-way stub into a pair of stub portions,
   (c) one stub portion including a statement-receiver section at one end adjacent the first fold-tear line receiving the name and address of the receiver, and a statement-sender section spaced above the statement-receiver section adjacent the second fold-tear line receiving the name and address of the sender,
   (d) the other stub portion including a statement-sender section at one end adjacent the second fold-tear line receiving the name and address of the sender, the stub portions being separated along the second fold-tear line by the sender upon return to the sender for account processing.

4. In a mailing unit:
   (a) a sheet having a first transverse fold-tear line that divides the sheet into a statement and a two-way stub above the statement,
   (b) the statement receiving entries of charges, credits, balance and other information,
   (c) a second transverse fold-tear line spaced above the first fold-tear line which divides the stub into a pair of stub portions,
   (d) the stub portion between the fold-tear lines including a statement-receiver section at one end adjacent the first fold-tear line receiving the name and address of the receiver, and a statement-sender section spaced above the statement-receiver section adjacent the second fold-tear line receiving the name and address of the sender,
   (e) the stub portion above the second fold-tear line including a statement-sender section at one end adjacent the second fold-tear line receiving the name and address of the sender, and a statement-receiver section spaced above the statement-sender section receiving the name and address of the receiver, and
   (f) each stub portion including a statement-receiver account number and a statement-sender number, and including a section for the entry of money paid by the receiver.

5. In a mailing unit:
   (a) a sheet having a transverse fold-tear line that divides the sheet into a statement and a two-way stub,
   (b) a transverse fold-tear line dividing the two-way stub into a pair of stub portions,
   (c) one stub portion including a statement-receiver section at one end receiving the name and address of the receiver, and a statement-sender section spaced above the statement-receiver section receiving the name and address of the sender,
   (d) the other stub portion including a statement-sender section at one end receiving the name and address of the sender,
   (e) an envelope having an addressee window showing the statement-receiver section on the said one stub section, and having an addressor window spaced above the addressee window showing the statement-sender section on the same said one stub portion when the sheet is folded on the first tear line, and (f) another envelope having an addressee window at one end showing the addressee section on the other stub portion when the statement is detached along the first fold-tear line and the two-way stub is folded along the second fold-tear line.

6. In a mailing unit:
(a) a sheet having a first transverse fold-tear line that divides the sheet into a statement and a two-way stub,
(b) a second transverse fold-tear line dividing the two-way stub into a pair of stub portions,
(c) one stub portion including a statement-receiver section at one end adjacent the first fold-tear line receiving the name and address of the receiver, and a statement-sender section spaced above the statement-receiver section adjacent the second fold-tear line receiving the name and address of the sender,
(d) the other stub portion including a statement-sender section at one end adjacent the second fold-tear line receiving the name and address of the sender, and a statement-receiver section spaced above the statement-sender section receiving the name and address of the receiver,
(e) an envelope having an addressee window showing the statement-receiver section on the said one stub section, and having an addressor window spaced above the addressee window showing the statement-sender section on the same said one stub portion when the sheet is folded on the first fold-tear line, and
(f) another envelope having an addressee window at one end showing the statement-sender section on the said other stub portion, and having an addressor window spaced above the addressee window showing the statement-receiver section on the same said other stub portion when the statement is detached and two-way stub is folded along the second fold-tear line.

7. In a mailing unit:
(a) a sheet having a first transverse fold-tear line that divides the sheet into a statement and a two-way stub above the statement,
(b) the statement receiving entries of charges, credits, balance and other information,
(c) a second transverse fold-tear line spaced above and parallel to the first fold-tear line which divides the stub into a pair of stub portions,
(d) the stub portion between the fold-tear lines including a statement-receiver section at one end adjacent the first fold-tear line receiving the name and address of the receiver, and a statement-sender section spaced above the statement-receiver section adjacent the second fold-tear line receiving the name and address of the sender,
(e) the other stub portion above the second fold-tear line including a statement-sender section at one end adjacent the second fold-tear line receiving the name and address of the sender,
(f) an envelope having an addressee window showing the statement-receiver section on the said one stub section between the fold-tear lines, and having an addressor window spaced above the addressee window showing the statement-sender section on the same said one stub portion when the sheet is folded on the first fold-tear line, and (g) another envelope having an addressee window at one end showing the statement-sender section on the said other stub portion above the second fold-tear line when the statement is detached and the two-way stub is folded along the fold-tear line.

8. In a mailing unit:
(a) a sheet having a first transverse fold-tear line that divides the sheet into a statement and a two-way stub above the statement,
(b) the statement receiving entries of charges, credits, balance and other information,
(c) a second transverse fold-tear line spaced above and parallel to the first fold-tear line which divides the stub into a pair of stub portions,
(d) each stub portion being provided with a statement-receiver account number and a statement-sender account number, and each stub portion being provided with a section for the entry of money paid by the receiver,
(e) the one stub portion between the fold-tear line including a statement-receiver section at one end adjacent the first fold-tear line receiving the name and address of the receiver, and a statement-sender section spaced above the statement-receiver section adjacent the second fold-tear line receiving the name and address of the sender,
(f) the other stub portion located above the second fold-tear line including a statement-sender section at one end adjacent the second fold-tear line receiving the name and address of the sender, and a statement-receiver section spaced above the statement-sender section receiving the name and address of the receiver,
(g) an envelope having an addressee window showing the statement-receiver section on the said one stub section between the transverse fold-tear line, and having an addressor window spaced above the addressee window showing the statement-sender section on the same said one stub portion when the sheet is folded on the first fold-tear line,
(h) another envelope having an addressee window at one end showing the statement-sender section on the said other stub portion above the second fold-tear line when the statement is detached and the two-way stub is folded along the second fold-tear line, and
(i) the stub portions being separable along the second fold-tear line so that the sender can retain one stub portion and so that an accounting service company can have the other stub portion to process the receiver's account, identified by the statement-receiver account number for the sender, identified by the statement-sender account number using automatic accounting equipment.

References Cited by the Examiner
UNITED STATES PATENTS

| | | | |
|---|---|---|---|
| 1,118,171 | 11/1914 | Albree | 283—66 |
| 2,895,534 | 7/1959 | Steidinger | 229—69 |
| 2,950,045 | 8/1960 | Martin | 229—92.3 |
| 2,964,232 | 12/1960 | Schuessler | 229—73 |
| 3,073,509 | 1/1963 | Schuessler | 229—92.3 |

JOSEPH R. LECLAIR, *Primary Examiner.*

FRANKLIN T. GARRETT, *Examiner.*